United States Patent

[11] 3,573,338

[72] Inventor Dorsey Davidoff
 Fort Lee, N.J.
[21] Appl. No. 479,674
[22] Filed Aug. 13, 1965
[45] Patented Apr. 6, 1971
[73] Assignee United States of America as represented by the Secretary of the Navy

[54] FRESNEL IMAGE COMPUTER
 3 Claims, 5 Drawing Figs.
[52] U.S. Cl. .................................................... 35/10.2,
 35/12, 178/6.8
[51] Int. Cl. ..................................................... G09b 9/08
[50] Field of Search ........................................... 35/10.2, 12,
 10.4

[56] References Cited
 UNITED STATES PATENTS
 3,131,247 4/1964 Benamy et al. ............... 35/10.4
 3,293,348 12/1966 Blackadder et al. .......... 35/10.2
 3,327,407 6/1967 Barnes ......................... 35/12

Primary Examiner—Malcolm A. Morrison
Assistant Examiner—Felix D. Gruber
Attorneys—Raymond I. Tompkins and Lawrence S. Epstein ABSTRACT: A TV projection system for simulating on a common projector screen the appearance of an aircraft landing area and an associated Fresnel-type visual landing aid through the use of a TV projector for the landing area image and a beam writing projector for the landing aid image, the system utilizing a flying spot scanner TV image method and containing a transparency representative of the landing area and having a reflective pointer positioned in such a way with respect to the flying spot scanner horizontal and vertical sweep directions so that the point of the pointer is first touched by the flying spot in each frame, an optical pickup above the transparency to pick up reflected video from the arrow so that the first video pulse per frame represents the beam writing pattern center position on the flying spot scanner as well as on the TV projector, a sampling system to sample the TV yoke currents at the first video pulse, and two DC stabilized operational amplifiers, which may include yoke driver output stages, connected in such a way as to produce the desired beam writing pattern in the beam writing projector, properly positioned with respect to the TV projector, when both images are projected on the common screen.

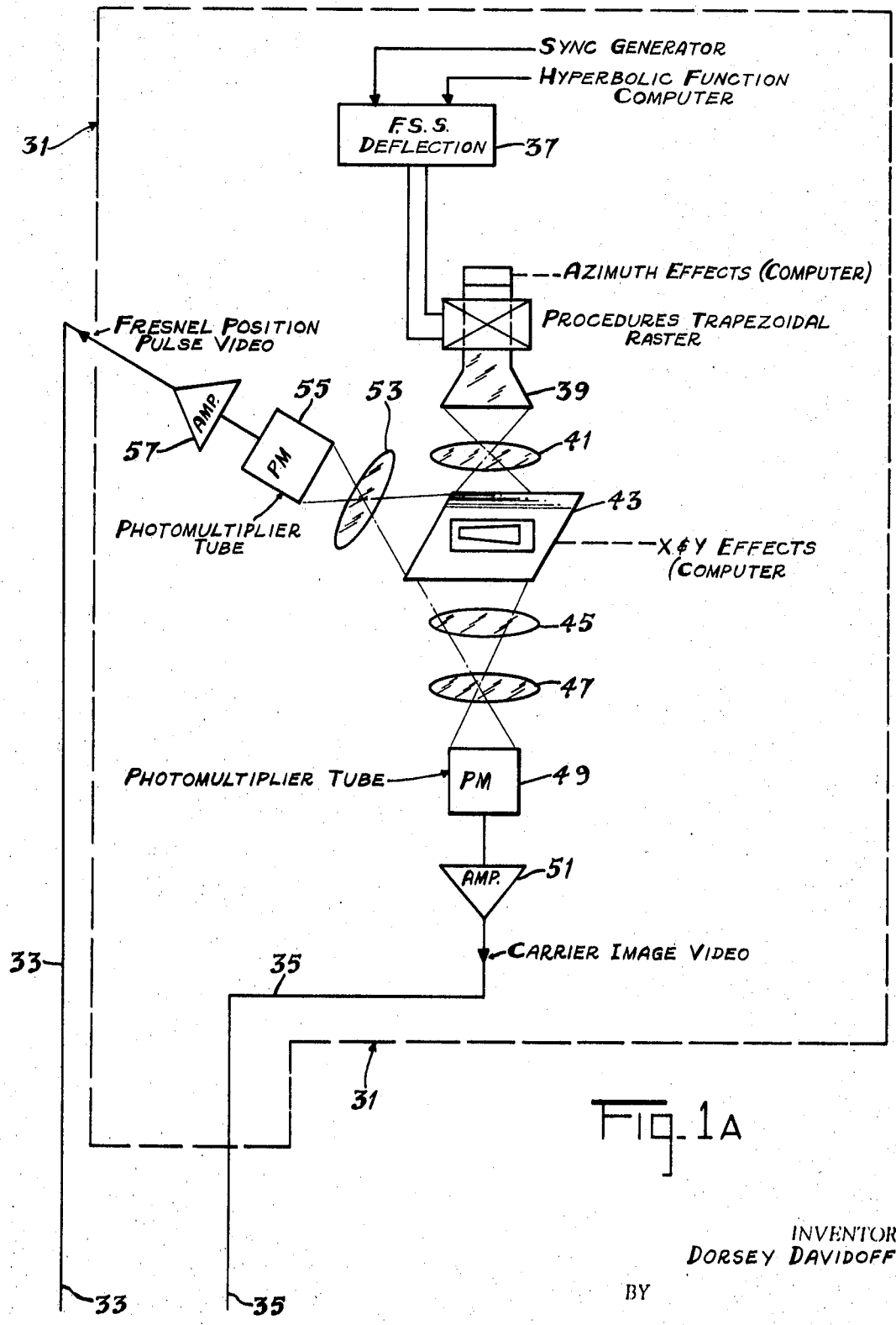

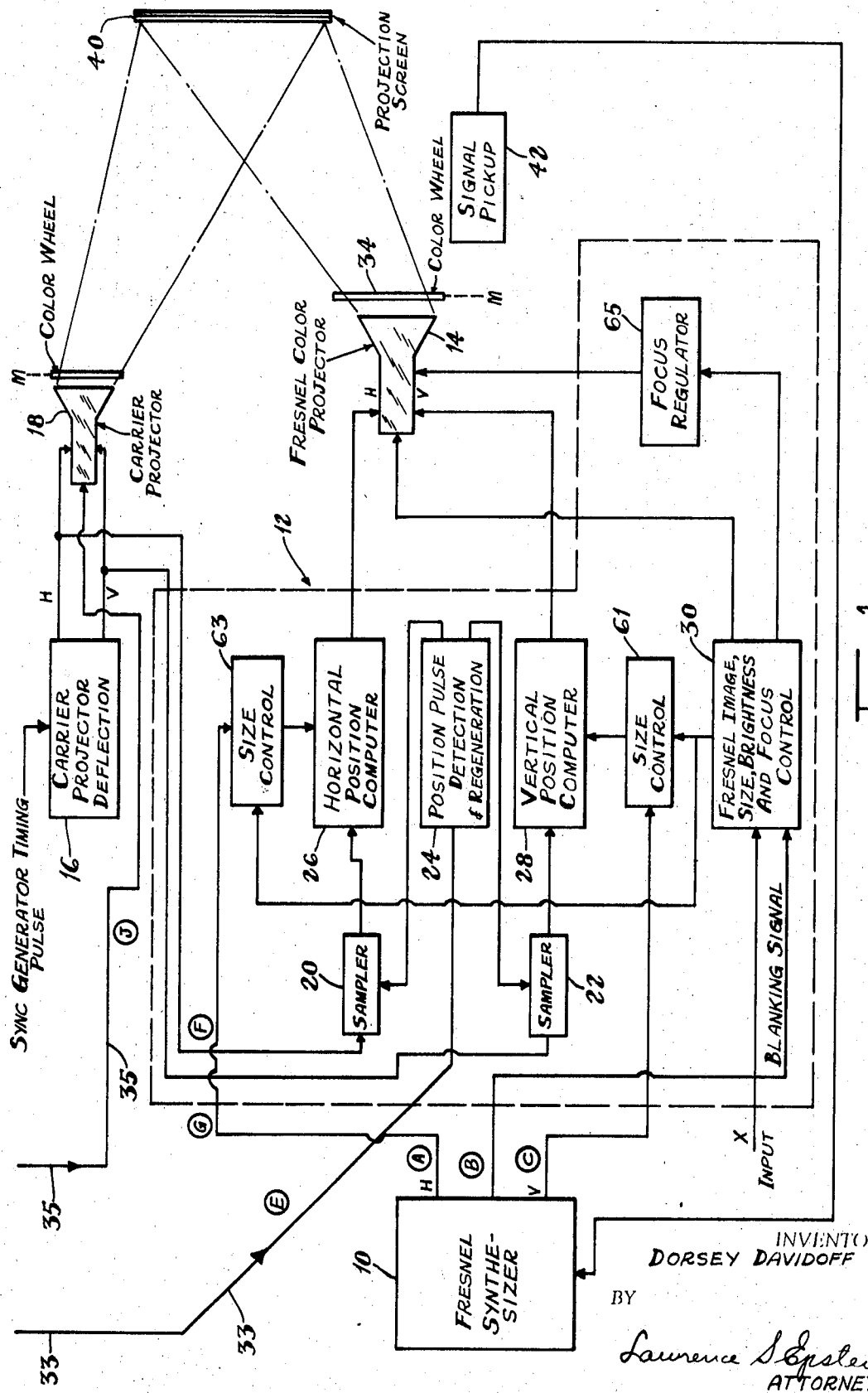

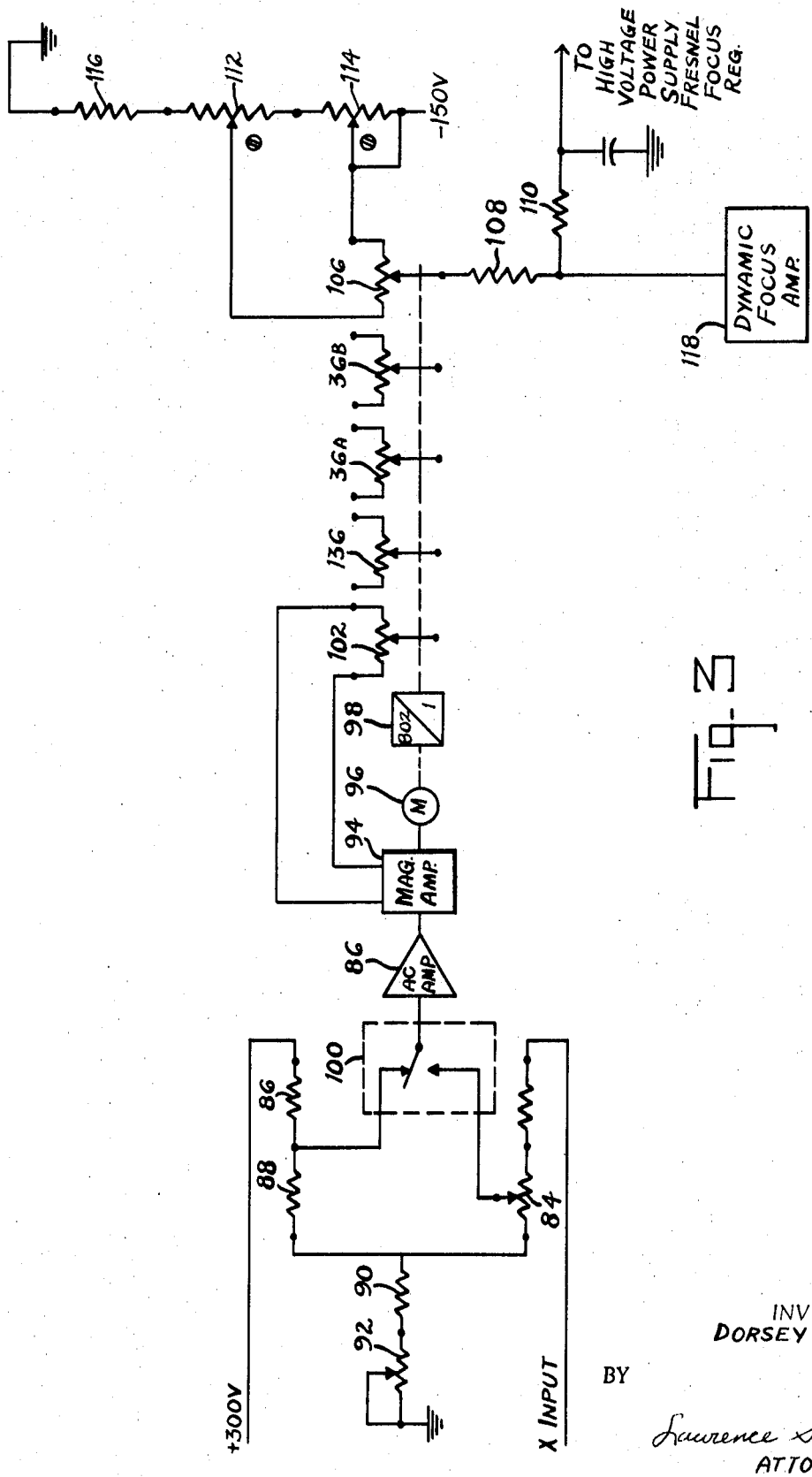

FRESNEL IMAGE COMPUTER

This invention relates generally to image positioning devices and more particularly to a device for generating and combining a plurality of synthesized signals representative of basic aircraft flight parameters so as to drive a system which spot-scans a color transparency of a simulated carrier or airfield for training purposes.

Landing of a high-speed aircraft on the deck of a moving aircraft carrier of the Forrestal class or on a typical naval airfield is a difficult and complex operation requiring a high degree of pilot skill. A great many pilot landing aids have been developed to ease these difficulties and alleviate the dangers involved. One of the most effective is a sensitive optical system employing Fresnel lenses. The system furnishes a visual aid to an incoming pilot to establish the proper glide angle for an aircraft carrier landing. It is primarily an electro-optical system installed along the flight decks of the aircraft carrier to provide a fixed horizontal bar of light and a vertically movable center light that indicates the correct glide path angle to the pilot of an approaching landing aircraft.

A horizontal bar of light, formed by the combined action of a set of source lights, Fresnel lenses, and lenticular lenses, is seen in the aperture of the Fresnel lens assembly mounted on the edge of a field or carrier deck by the incoming pilot as he brings his aircraft down toward the flight decks for a landing. The relative vertical position of this bar of light, as indicated by its alignment with the center light indicates to the pilot whether he is above, below, or on the ideal glide path.

Obviously, proper utilization of the Fresnel lens optical landing system by properly trained pilots will be effective in providing a greater degree of reliability in aircraft landing procedures.

The most common form of training for student pilots is the ground flight trainer employing a display projection screen and a control console. Training is imparted by the illusion of motion created by the display itself, by the conditions imposed or injected by the instructor during a problem, and by student control. The display is caused to change in response to the simulated speed, course, pitch, roll and attitude of the simulator to create a visual sensation of motion. By providing an adapter unit to the simulator, a positive indication of simulated Fresnel images may be provided to the student pilot.

It is therefore a prime object of the present invention to provide for an adapter unit whereby a synthetic Fresnel optical signal may be presented on a flight simulating trainer.

It is another object of the present invention to provide a Fresnel beam simulator whereby a realistic display of Fresnel landing lights is presented.

It is a further object of this invention to provide a novel apparatus for positioning a plurality of synthesized Fresnel signals on the face of a cathode-ray tube.

It is still a further object of this invention to provide a unique circuital arrangement for computing the proper position of a synthetic Fresnel signal on the face of a cathode-ray tube.

Another object of the present invention is to provide a device which is capable of synchronizing two component displays produced by cathode-ray tube projectors, projecting on a common screen, where one projector is part of a television chain and the other is a beam writing or beam positioning form of display.

Other objects and many of the attendant advantages of this invention will be readily appreciated as the same becomes better understood by reference to the following detailed drawings wherein:

FIGS. 1a and 1b represent a block diagram illustrative of the perspective image generating system showing the Fresnel signal synthesizer and position computer of the present invention as parts thereof;

FIG. 3 discloses a further section of the Fresnel image computer disclosed in FIGS. 1a and 1b concerned with size, brightness and focus.

Figure 2A:
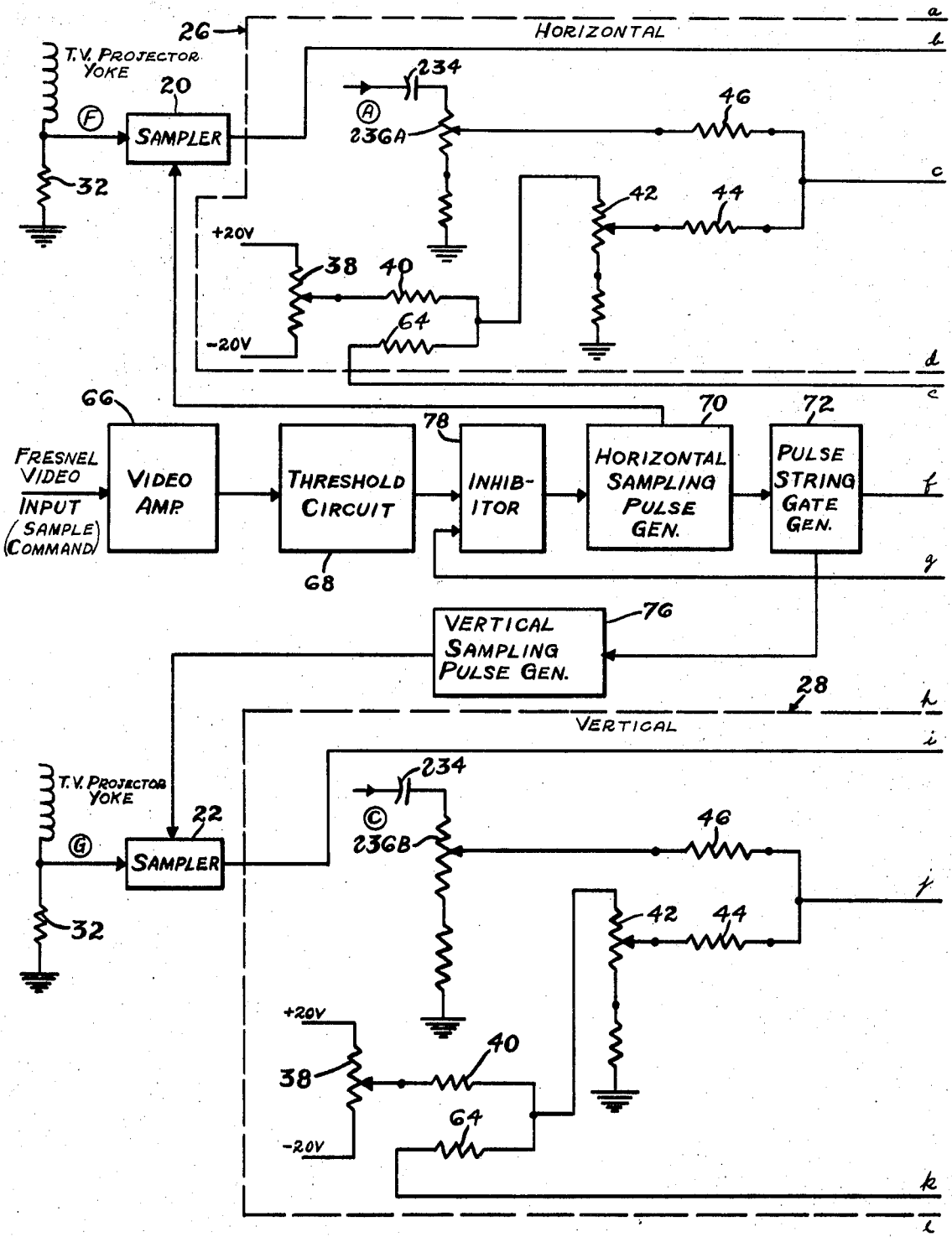
FIG. 2a is a partial schematic of the computer arrangement disclosed in FIGS. 1a and 1b concerned with the positioning synchronization of the Fresnel image with the carrier image.

To create a realistic presentation, the image of a carrier deck or similar landing field is artificially generated and projected onto a screen. Superimposed upon the same screen is a Fresnel image. The generation, positioning, and display of the Fresnel optical landing system lights are accomplished simultaneously with the generation and display of the landing field projector.

Referring to FIGS. 1a and 1b, the Fresnel optical landing system lights are provided by the Fresnel synthesizer 10, the Fresnel computer 12 and the Fresnel projector unit 14. The Fresnel synthesizer 10 generates an image of the Fresnel system by a direct cathode-ray tube spot writing technique. It operates in conjunction with a red-green color wheel 14a, on the Fresnel projector, to generate red, green, and amber colors, in the image. The synthesizer is part of a system whereby the image is generated and controlled in size, brightness, focus, and positioned in its proper location on the screen in synchronism with the television display of the carrier. The Fresnel synthesizer 10 is the subject of copending application Ser. No. 479,673, filed Aug. 13, 1965, and is discussed fully therein.

The carrier image is generated by a flying spot scanner, referred to as a F.S.S. This flying spot scanner 31 utilizes an inverse perspective scanning raster (trapezoidal in shape) to produce a perspective carrier representation on a carrier projector 18. It also provides a Fresnel position pulse video signal which is coupled over line 33. This Fresnel position pulse video signal is fed to one element of the Fresnel computer 12. The carrier image video signal, generated by this flying spot scanner 31, is coupled over line 35 to the carrier projector 18. This projector 18 presents the image of a carrier deck or landing field which is projected on a common screen 40. Superimposed upon the same screen 40, is the Fresnel image, projected by the Fresnel projector 14.

The flying spot scanner 31 basically comprises a flying spot scanner deflection circuit 37 which is fed by a synchronized signal from a sync generator (not shown) and a signal having a hyperbolic function, from a hyperbolic function computer (not shown). The output of this flying spot scanner deflection circuit 39, is then coupled to a flying spot scanner cathode-ray tube, referred to as a CRT, 39, which provides a trapezoidal raster so as to produce the effect of perspective. The output of the CRT 39 is a flying spot of light which is focused by means of lens 41. The lens focuses said trapezoidal raster on a transparency 43 of an aircraft carrier. This transparency of a carrier is capable of being moved in the X and Y directions. Such effects are controlled by signals derived from a computer which supplies information pertaining to the relative position of an aircraft to the landing area of a carrier. Additionally, azimuth effects are provided by rotating the CRT 39, said azimuth effects are obtained from the same computer which supplies the X and Y signals. The light traveling through the transparency 43 is then focused at a photomultiplier tube 49 through two collimating lenses 45 and 47. The signal picked up by the photomultiplier 49 is amplified by amplifier 51 which is subsequently coupled to the carrier projector 18. This signal coupled over line 35 is the carrier image video signal. A Fresnel position arrow is mounted on the transparency 43 so that its tip touches the position of the Fresnel. This arrow is made of a white opaque reflecting material. It is positioned in such a way that the tip is the first point touched by the flying spot each frame. This occurs in conjunction with the fact that the scanning is always from near to far objects and always from right to left. The light reflected from the Fresnel position arrow mounted on transparency 43, is focused by means of lens 53, and detected by photomultiplier tube 55. The output of said photomultiplier assembly 55 is then amplified by amplifier 57 which subsequently couples said detected signal over line 33 to the Fresnel computer 12.

A carrier projector deflection circuit 16, that is fed by the output signals from the sync generator (not shown) provide the proper horizontal and vertical linear deflection currents to the carrier projector 18's deflection yoke coils.

The present invention relates particularly to the Fresnel computer which controls the size, brightness, focus and position of the Fresnel presentation projected by the Fresnel projector unit 14. The Fresnel computer 12 receives the Fresnel horizontal and vertical deflection waveforms and blanking waveforms from the Fresnel synthesizer 10. The computer 12, processes and delivers these deflection signals, properly sized and properly positioned, to the Fresnel deflection yokes in the Fresnel projector 14, where they produce the Fresnel image.

To be more specific, the horizontal and vertical deflection signals generated by the Fresnel synthesizer 10 are coupled respectively to a horizontal position computer 26, and a vertical position computer 28. The output of the horizontal position computer 26 and the output of the vertical position computer 28, are subsequently coupled to the Fresnel color projector 14. The Fresnel position pulse generated by the flying spot scanner 31, which is coupled over line 33, is coupled to a pulse position detection and regenerative circuit 24. This circuit provides two outputs, coupled to samplers 20 and 22, in the horizontal and vertical sections of the position computer. Additionally, these two sampler circuits 20 and 22, sample the horizontal deflection and vertical deflection currents which are generated by the carrier projector circuit 16. The output of these two sampling circuits, 20 and 22, are then respectively coupled to another input of the horizontal position computer 26 and the vertical position computer 28.

Figure 2B:
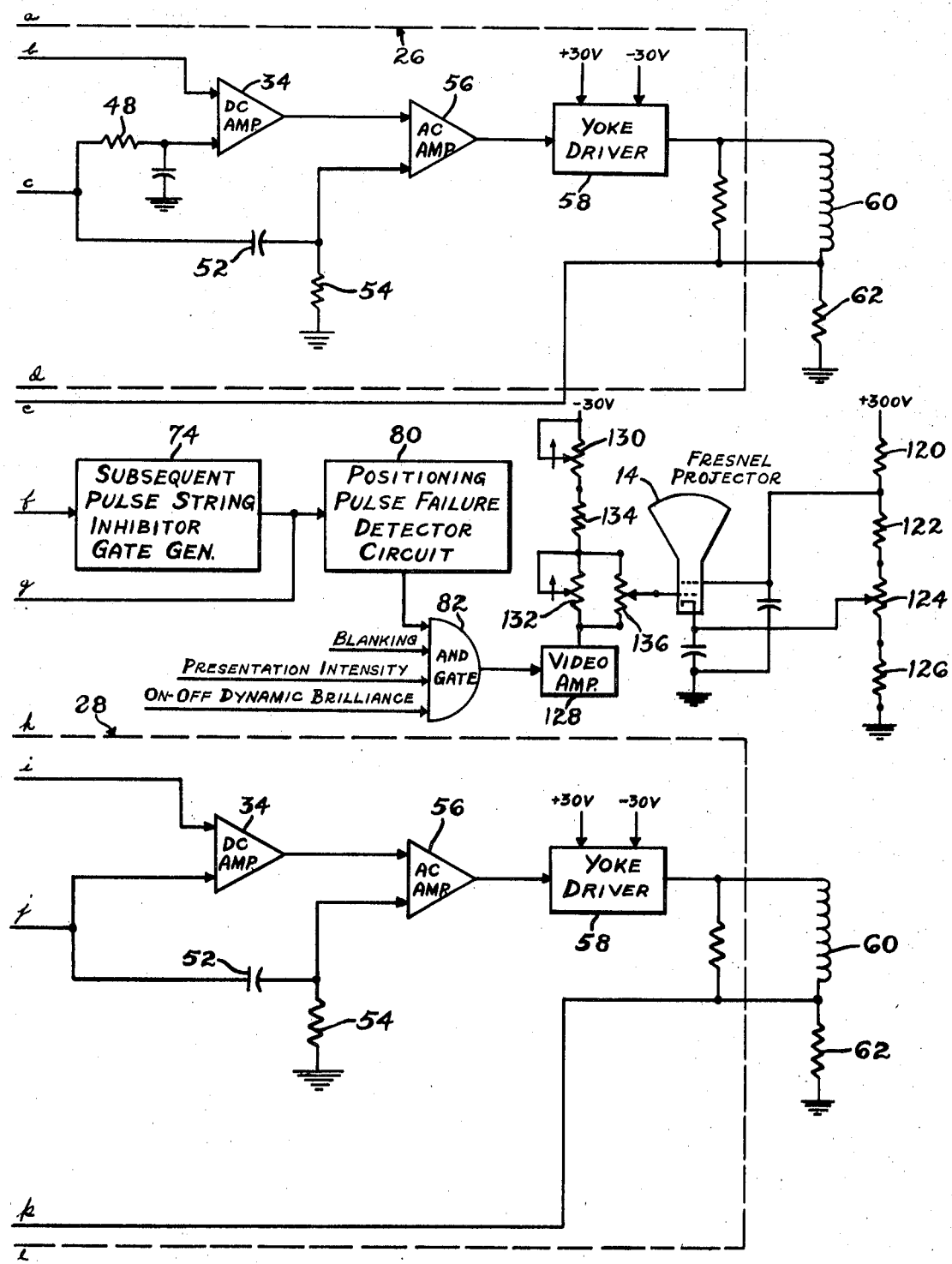
FIG. 2b is a continuation of FIG. 2a showing the computer arrangement disclosed in FIGS. 1a and 1b.

Referring additionally to FIGS. 2a and 2b, the blanking signal derived from the Fresnel synthesizer 10, is coupled to one input of the Fresnel computer 12, and is fed to AND gate 82 in conjunction with a remote brightness control input and an input from the positioning pulse failure detector circuit 80. A potentiometer 136, in series with video amplifier 128 controls the brightness as a function of range.

An X (range) input signal is coupled to the Fresnel image size, brightness and focus control means 30, FIGS. 1a and 1b, shown in detail in FIG. 3. One of the output signals generated from said Fresnel control circuit 30 is coupled to size control circuits 61 and 63, FIGS. 1a and 1b, which varies the magnitude of the horizontal and vertical deflection signals obtained from the Fresnel synthesizer 10. These signals are subsequently coupled to the horizontal and vertical position computers 26 and 28. Additionally, the Fresnel control circuit 30, provides a signal which is coupled to a focus regulator 65 which generates an output signal which is utilized to focus or defocus the Fresnel color projector 14, as a function of range and atmospheric conditions. The computer unit 12 produces a complete Fresnel image each time a motor driven color wheel 14a, makes one revolution. A small piece of magnetic tape cemented near the center of this wheel produces a pulse in a magnetic pickup 42, a short interval after the start of the green field. This pulse is thereupon fed to the synthesizing unit 10 to start the image sequence cycle.

Turning to FIGS. 2a and 2b, for a more detailed disclosure of the computer unit 12 and its connections disclosed in FIGS. 1a and 1b, two television projector yoke sampler resistors 32 have generated across them voltages which are representations of the horizontal and vertical deflection current signals. These resistors 32 are part of the carrier projection deflection circuit 16, FIGS. 1a and 1b, and the voltages across these resistors 32 are representative of the instantaneous position of the carrier projector television scan. These voltages are then fed to sampler units 20 and 22 which sample this instantaneous position at the time of arrival of a sample command Fresnel positioning arrow signal from F.S.S. 31. This sample command occurs at the instant the F.S.S. spot has touched the Fresnel position. The carrier projector; therefore, at this instant, is on the spot on the screen corresponding to the Fresnel position on the screen. The samples produced by the samplers 20 and 22 are therefore two DC voltages which represent the position on the screen to which the Fresnel presentation is to be positioned. These signals are then fed to chopper stabilized DC amplifiers 34 forming part of the position computers 26 and 28, each containing yoke driver output stages 58. These act to position the Fresnel pattern to the sampled positions.

Fresnel horizontal and vertical deflection waveforms from the synthesizer 10 are fed through a DC isolation capacitance 234 and into variable potentiometers 236A and 236B which control the Fresnel horizontal and vertical size by means of a servo unit described below in connection with FIG. 3.

A horizontal centering voltage is generated across variable resistance 38 and is subtracted from the feedback voltage from resistor 62 by summing resistors 40 and 64. This difference is then fed to horizontal sensitivity potentiometer 42. The resultant horizontal sensitivity control voltage is subtracted from the Fresnel horizontal deflection waveform voltage from 236A by summing resistors 46 and 44. The result is the feedback DC positioning signal plus the AC Fresnel deflection signal waveform error. Integrating resistance 48 and integrating capacitance 50 feed the feedback DC positioning signal to DC amplifier 34. The first chopper of the DC amplifier compares this input with the DC positioning signal from the sampler 20. Any error is produced as a 400 volt signal which is amplified and then demodulated by a second chopper.

The AC Fresnel deflection signal waveform error from resistors 46 and 44, is fed through differentiating capacitance 52 and differentiating resistance 54 to AC amplifier unit 56 which also receives the output of DC amplifier 34. The resultant output of AC amplifier 56 is fed to yoke driver unit 58 and thereon to the horizontal yoke 60 of Fresnel projection unit 14. A sampling resistance 62 is connected to the Fresnel horizontal yoke 60 whereupon the voltage generated thereacross may be returned to resistance 64 to form a comparator signal as described above. In this manner, horizontal positioning of the Fresnel horizontal deflection signal is accomplished with reference to the carrier deflection signal generated in the carrier projector deflection circuit 16. Vertical position signals are generated in precisely the same manner by an equivalent circuit shown in FIGS. 2a and 2b. Block 28 is the functional and structural equivalent of block 26 and the numerical designations therein have been repeated for the sake of brevity and convenience. It is noted, however, that Fresnel vertical size potentiometer utilized in block 28 is designated as element 236B to better illustrate the relationship between the several size control potentiometers and the several mechanisms described in connection with FIG. 3 below.

The Fresnel position pulse video signal described above is connected to a position pulse detection and regeneration means 24, and more particularly to a Fresnel video amplifier 66 and then applied to variable thresholding circuit 68. When the threshold is exceeded, a blocking oscillator, labeled horizontal sampling pulse generator 70, is triggered. The threshold adjustment is set so that only pulses representing the Fresnel pickoff are passed beyond the threshold. All noise pulses of low amplitude are rejected by the threshold. The output of horizontal sampling pulse generator 70 controls the sampling of the horizontal input sampler 20. The horizontal sampling pulse generator generates a ½-microsecond pulse each time it is triggered. In each television frame, three horizontal sampling pulses are generated and one vertical sampling pulse is generated so that the total sampling time for both samplers is 1.5 microseconds. This is controlled by the pulse string gate generator 72, and the subsequent pulse string inhibitor gate generator 74. Pulse string gate generator 72, is triggered by the first horizontal sampling pulse of the frame. The output of the pulse string gate generator 72, is fed to vertical sampling pulse generator 76, and then to vertical sampling input unit 22. The vertical sampling pulse generator 76 generates a 1.5-microsecond pulse each time it is triggered.

As stated, pulse string gate generator 72 is triggered by the first horizontal sampling pulse of the frame. This gate generator further generates a gate which lasts for three horizontal television lines. Its leading edge also triggers the vertical sampling pulse generator 76 described above which generates a single 1.5-microsecond sampling pulse. The lagging edge of the pulse string gate generator 72 pulse, triggers the subsequent pulse string inhibitor gate generator 74. This gate generator generates a gate whose length is somewhat less than one frame. This pulse is supplied to the inhibit gate 76, located between threshold circuit 68 and horizontal sampling pulse generator 70. This inhibit gate is a R-C type of AND logic circuit. It acts to inhibit any pulses, which would normally pass the threshold, from triggering of horizontal sampling pulse generator 70. The action of the pulse string gate generator 72, and the subsequent pulse string inhibitor gate generator 74, is to allow only three horizontal sampling pulses each frame. Gate generator 74 has an output which is also fed to a positioning pulse failure detector circuit 80. In operation, if the subsequent pulse string inhibitor gate generator 74, is putting out pulses every frame, the output of the positioning failure detector circuit 80 will be an open circuit. If the subsequent pulse string inhibitor gate generator 74 stops putting out pulses, then the output of the positioning pulse failure detector circuit 80 becomes grounded. The resultant signal is fed to the Fresnel video AND gate 82 to turn off the Fresnel projector 14.

Referring now to FIG. 3, a 1/X computer is used to control size, brightness and focus of the Fresnel image as it varies from 8,000 feet to 150 feet from the pilot's eye. X represents this distance from an operational Fresnel image to the pilot's eye. This servo is necessary since the size of the Fresnel varies inversely with distance. The brightness also varies inversely with the distance. The focus must be adjusted so that when the Fresnel image is small it must be in perfect focus so as to obtain the maximum resolution capabilities of the CRT. It must be defocused when the Fresnel is large so that the diameter of each light might be simulated by defocusing. The 1/X function is obtained by connecting the feedback potentiometer of the servo so as to attenuate the input signal X. The resultant function is X times the servo output and this is compared with a fixed voltage. At balance, the servo output potentiometer must be positioned to 1/X. In addition, the 1/X function must be displaced from the Fresnel position because the X function at 0 is located 9,000 feet beyond the touchdown point. This of course, would simulate the end of the runway on the landing field presentation. The comparison voltage and the offset voltage mentioned are produced by a resistance divider made up of resistances 86, 88, 90 and 92 dividing between the ±300 volts computer supply and ground. The function of resistances 88 and 90 is the offset voltage which corresponds to 9,000 feet. The junction of resistances 86 and 88 is the comparison voltage which corresponds to 150 feet beyond the 9,000-foot point. When the X input is 150 feet greater than 9,000 feet, resistance 84, the feedback potentiometer, will be at the end of its travel since this is the nearest distance simulated. When the X input is 300 feet greater than 9,000 feet, the arm of resistance 84 will run down to balance the voltage at the junction of resistance 86 and 88. This doubling of the distance causes the Fresnel size to half as controlled by the mechanical shaft coupling to resistances 236A and 236B of the horizontal and vertical positioning computer devices described above. The servo output shaft is therefore inversely proportional to distance (1/X). The 300-foot size adjustment control potentiometer 92 is used to calibrate the size of the Fresnel presentation to make it correspond with the X input distance.

The servo unit described above consists basically of an AC servo-amplifier transformer coupled to a magnetic amplifier 94 which is in turn coupled to a 400-cycle servomotor 96 and gear train 98. The AC amplifier 87 is driven by a 400-cycle chopper 100 which serves to sample the two input lines of the resistance dividers described above. The output shaft of gear train 98 serves to position the following: electrical end stop resistance 102 for controlling magnetic amplifier 94; Fresnel horizontal size potentiometer 236A; Fresnel vertical size potentiometer 236B; brightness control potentiometer 136; and focus control potentiometer 106.

Fresnel image size, brightness and focusing is accomplished through use of Fresnel image control means 30, FIGS. 1a and 1b, shown in detail in FIG. 3. Focusing control is accomplished through the use of a voltage source which may be varied through the use of potentiometer 106 which is mechanically coupled to the output shaft of gear train 98. Two fixed resistors 108 and 110 connect this potentiometer to the high-voltage power supply. The end point voltages of potentiometer 106 are individually adjustable by near focus adustment potentiometer 112 and far focus adustment potentiometer 114. Far focus adjust is adjusted when the Fresnel is between 4,000 and 8,000 feet away for the best possible focus. The near focus is adjusted when the Fresnel is approximately 300 feet away to give each Fresnel light its proper diameter with respect to its overall size of the screen. Further resistance 116 is connected in series with the focus adjust potentiometers and serves to connect the serial resistive network to ground. Further defocusing is accomplished by dynamic focus amplifier 118 which serves to simulate ceiling and visibility limitations by defocusing in conjunction with a dimming circuit. The dynamic focus amplifier input and the Fresnel on-off dynamic brilliance signal are generated in a special effects device. Provision is made for channeling this brightness signal in conjunction with blanking effects to the Fresnel CRT 14. This is accomplished by varying the voltages for the cathode and first grid. Brightness and blanking are controlled on the first grid. The cathode and the second grid are supplied from a divider resistance chain connected between plus +300 volts and ground consisting of resistances 120, 122, potentiometer 124 and grounding resistor 126. This arrangement has the advantage of turning the second grid voltage on at the same time as the cathode bias voltage. If the accelerator voltage was connected to a separate supply or a separate divider chain, the chances for the second grid voltage coming on without the bias would be greatly increased. The brightness blanking signal is applied to the control grid. When there is no blanking signal present on the grid, the CRT should be extinguished. This is accomplished by adjusting CRT extinction adjust potentiometer 124 which adjusts the bias on the CRT cathode for cutoff conditions. The CRT is turned on when an unblanking signal is applied to the control grid. This unblanking signal consists of a series of positive pulses all of the same amplitude. The amplitude determines the brightness of the image. This unblanking waveform is the Fresnel blanking waveform from the synthesizer which has been inverted and modified in amplitude according to the brightness required. The signal reaches the CRT through an AND gate 82 and video amplifier 128. Blanking amplifier 128 is fed by AND gate 82 which has connected thereto a plurality of inputs. These signals are presentation intensity, on-off dynamic brilliance from a special effects device, a blanking signal from the synthesizer and the positioning pulse failure signal from the positioning pulse failure detector circuit 80 described above. Video amplifier 128 receives the output of the AND gate 82, inverts it, and amplifies it, so as to produce the brightness unblanking signal as a current in its output. The output load consists of two variable resistances 130 and 132 and a fixed resistance 134 all connected in series. The voltage developed at the output of video amplifier 128 is the voltage developed across each resistor which is determined by its resistance value and the value of the output current. The said three resistors are connected so as to develop a far brightness signal, appropriate to large values of X, in resistance 130 and 134, and a near brightness signal across resistances 130, 134, and 132. Potentiometer 132 has a further potentiometer 136 connected in parallel thereto. The shaft arm of potentiometer 136 is mechanically coupled to the drive shaft of gear train 98 of the 1/X servo-amplifier described in FIG. 3. The output of potentiometer 136 is fed to CRT 14, and serves to control brightness. It moves between the near and far unblanking signals as the X distance varies from near to far.

Obviously many modifications and variations of the present invention are possible in the light of the above teachings. It is

I claim:

1. In a device for simulating the appearance of an aircraft landing area and an associated Fresnel type visual landing aid, the combination comprising:
    a first source (16) of signals including a first horizontal signal component and a first vertical signal component, representative of said landing area;
    a second source (10) of signals including a second horizontal signal component, a second vertical signal component, and a blanking signal component;
    means (31) for generating landing aid position pulses representative of the position of the landing aid with respect to said landing area;
    position pulse detection means (24) responsive to said position pulses to provide position signals;
    a landing aid horizontal position computer (26);
    a landing aid vertical position computer (28);
    first and second sampler means (20, 22) responsive to said position signals to sample said first horizontal and first vertical signal components, respectively, and to provide signal voltages corresponding thereto as outputs to said horizontal and vertical position computers, respectively;
    a Fresnel image control means (30) responsive to said blanking signal component and to an input signal which is an analogue representation of simulated distance from a simulated aircraft to said landing aid to provide size control signals as one output and Fresnel image video signals as another output;
    first and second size control means (63, 61) connected to receive said second horizontal and second vertical signal components, respectively, and responsive to said size control signals to apply size-corrected horizontal and vertical signal components to said horizontal and vertical position computers, respectively, said position computers being responsive to said signal voltage outputs of said sampler means and to said size corrected signal components to provide Fresnel image horizontal and vertical deflection signals; and
    a Fresnel color projector connected to receive said Fresnel image video signals and said Fresnel image horizontal and vertical deflection signals and responsive thereto to project an image simulating the appearance of said Fresnel type visual landing aid.

2. The combination of claim 1, and wherein said horizontal position computer comprises:
    DC amplifier means (34) responsive to signal voltages from said first sampler means and to said size-corrected horizontal signal component to provide a horizontal error signal;
    AC amplifier means (56) responsive to said error signal and said size-corrected horizontal signal component to provide horizontal yoke driver input signals; and
    yoke driver means (58) responsive to said yoke driver input signals to provide said Fresnel image horizontal deflection signals.

3. The combination of claim 2, and wherein said vertical position computer comprises:
    DC amplifier means responsive to signal voltages from said second sampler means and to said size-corrected vertical signal component to provide a vertical error signal;
    AC amplifier means responsive to said vertical error signal and said size corrected vertical signal component to provide vertical yoke driver input signals; and
    yoke driver means responsive to said vertical yoke driver input signals to provide said Fresnel image vertical deflection signals.